(12) United States Patent
Kurita (10) Patent No.: US 10,910,736 B2
(45) Date of Patent: Feb. 2, 2021

(54) CHARGING INLET (71) Applicant: Sumitomo Wiring Systems, LTD., Yokkaichi (JP)

(72) Inventor: Atsushi Kurita, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 16/633,319

(22) PCT Filed: Jul. 23, 2018

(86) PCT No.: PCT/JP2018/027437
§ 371 (c)(1),
(2) Date: Jan. 23, 2020

(87) PCT Pub. No.: WO2019/026661
PCT Pub. Date: Feb. 7, 2019

(65) Prior Publication Data
US 2020/0169011 A1 May 28, 2020

(30) Foreign Application Priority Data
Aug. 2, 2017 (JP) ................... 2017-149923

(51) Int. Cl.
*H01R 13/684* (2011.01)
*H01R 4/30* (2006.01)
(Continued)

(52) U.S. Cl.
CPC .............. *H01R 4/308* (2013.01); *H01R 9/22* (2013.01); *H01R 13/42* (2013.01); *H01R 13/684* (2013.01); *H01R 27/02* (2013.01)

(58) Field of Classification Search
CPC ........ H01R 9/22; H01R 13/42; H01R 13/684; H01R 13/68; H01R 13/696; H01R 27/02
See application file for complete search history.

(56) References Cited

U.S. PATENT DOCUMENTS 8,052,481 B2 * 11/2011 Azad .................. H01H 85/202
439/676
9,698,543 B2 * 7/2017 Kato .................. H01R 13/688
(Continued)

FOREIGN PATENT DOCUMENTS

JP     2000261936 A    9/2000
JP      201453091 A    3/2014
(Continued)

OTHER PUBLICATIONS

PCT/JP2018/027437. International Search Report & Written Opinion (dated Feb. 7, 2019). 8 Pages.

*Primary Examiner* — Edwin A. Leon
*Assistant Examiner* — Milagros Jeancharles
(74) *Attorney, Agent, or Firm* — Loza & Loza, LLP (57) ABSTRACT

A charging inlet includes a first terminal including a first terminal body and a bus bar. An inlet body accommodates the first terminal body. A retaining member is attached to the inlet body from a rear side. The first terminal body includes a circular rod shaped first terminal connector. The bus bar includes a bus bar body, a bus bar-side fastening portion, and a first wire fastening portion. The bus bar body electrically connects the bus bar-side fastening portion and the first wire fastening portion. The retaining member includes a retaining body and a protruding portion. The first terminal connector is inserted through a first terminal insertion hole of the retaining body. The protruding portion is disposed along the bus bar body to retain the bus bar.

5 Claims, 12 Drawing Sheets

(51) Int. Cl.
    *H01R 9/22*     (2006.01)
    *H01R 13/42*     (2006.01)
    *H01R 27/02*     (2006.01)

(56) References Cited

U.S. PATENT DOCUMENTS

| | | | | |
|---|---|---|---|---|
| 2009/0149048 | A1* | 6/2009 | Pavlovic | B60L 3/0069 439/181 |
| 2010/0051311 | A1* | 3/2010 | Nakagawa | H01R 11/287 174/59 |
| 2011/0306221 | A1* | 12/2011 | Kamo | H01R 13/696 439/76.2 |
| 2012/0064771 | A1* | 3/2012 | Urrea | H01H 85/205 439/620.29 |
| 2014/0038463 | A1 | 2/2014 | Natter et al. | |
| 2015/0036487 | A1 | 2/2015 | Sakata | |
| 2015/0229055 | A1 | 8/2015 | Fukushima et al. | |
| 2018/0248275 | A1 | 8/2018 | Morita et al. | |
| 2020/0153173 | A1* | 5/2020 | Kurita | B60L 53/16 |

FOREIGN PATENT DOCUMENTS

| | | |
|---|---|---|
| JP | 2017117711 A | 6/2017 |
| WO | 2012052184 A | 4/2012 |

\* cited by examiner

CHARGING INLET

BACKGROUND

Field of the Disclosure

The present disclosure relates to a charging inlet.

Related Art

Japanese Laid-Open Patent Publication No. 2016-1522 describes an example of a prior art charging inlet. The charging inlet is used when charging an electric automobile or the like and complies with the so-called "combined charging system (CCS technology)" integrating a normal charging unit and a fast charging unit.

The charging inlet includes an inlet housing. The housing includes a first hood that is open to engage an associated normal charging connector and a second hood that is open to engage an associated fast charging connector. The second hood includes two second terminal connector receptacles that are open in the second hood. The second terminal receptacles accommodate a second power terminal and a second ground terminal.

Each second terminal has an overall circular rod shape, and an annular engagement flange extends from the circumferential surface of the second terminal. The second terminal has a rear end to which the conductive core of a wire is fastened through compression bonding, so that the second terminal is electrically connected to the wire. The wire connected to the second terminal is routed toward the rear side, which extends opposite to the engagement direction of the second terminal.

A wire that is connected to a first ground terminal has a further end connected to ground. A wire that is connected to the second power terminal has a further end, which is generally connected to a fuse located in a fuse box.

Since the second terminal needs to be connected to the fuse with a wire, the number of components is increased. The need for the task of connecting the wire to the second terminal and the fuse also increases the amount of work for coupling. In addition, the routing direction of the wire connected to the second terminal is limited to the rear side and thus cannot be changed to other routing directions.

SUMMARY

The present description discloses a charging inlet that includes a first terminal including a first terminal body and a bus bar, an inlet body accommodating the first terminal body, and a retaining member attached to the inlet body from a rear side. The first terminal body includes a first terminal connector and a first body-side fastening portion. The first terminal connector extends in a front-rear direction and has an overall circular rod shape. The first body-side fastening portion is disposed on a rear end of the first terminal connector. The bus bar includes a bus bar-side fastening portion fastened to be pivotable in relation to the first body-side fastening portion, a first wire fastening portion configured to fasten a terminal connected to a wire, and a bus bar body electrically connecting the bus bar-side fastening portion and the first wire fastening portion. The retaining member includes a retaining body and a protruding portion. The retaining body includes a first terminal insertion hole that is open so that the first terminal connector is inserted through the first terminal insertion hole. The protruding portion is disposed along the bus bar body to retain the bus bar.

With the configuration described above, when a wire connected to the first wire fastening portion of the bus bar extends in the direction of the bus bar, the routing direction of the wire may be changed to a direction other than the rear side, for example, by using a bus bar that is directed in a direction other than the rear side or pivoting the first wire fastening portion of the bus bar in relation to the first body-side fastening portion of the first terminal body.

Further, the protruding portion may be configured to include two holding plates holding the bus bar body.

With the configuration described above, since the bus bar body is held between the two holding plates, the bus bar is readily coupled to the retaining member.

Further, the configuration may include a second terminal including a second terminal body and a fuse. The second terminal body may include a second terminal connector and a second body-side fastening portion. The second terminal connector extends in the front-rear direction and has an overall circular rod shape. The second body-side fastening portion is disposed on a rear end of the second terminal connector. The fuse may include a fuse-side fastening portion fastened to be pivotable in relation to the second body-side fastening portion, a second wire fastening portion configured so that a terminal connected to a wire is fastened to the second wire fastening portion, and a fuse body electrically connecting the fuse-side fastening portion and the second wire fastening portion so that electrical connection is disconnected when overcurrent flows. The inlet body may accommodate the second terminal body. The retaining body may include a second terminal insertion hole that is open so that the second terminal connector is inserted through the second terminal insertion hole. The fuse may be disposed along the protruding portion.

With the configuration described above, since the fuse-side fastening portion of the fuse is fastened to the second body-side fastening portion, a typical wire that connects the second terminal body and the fuse is not needed. This reduces the number of components and the amount of work for coupling.

In addition, the fuse-side fastening portion of the fuse is fastened to be pivotable in relation to the second body-side fastening portion. Thus, the routing direction of a wire connected to the second wire fastening portion of the fuse may be changed to a direction other than the rear side.

Further, a nut may be fastened to the first body-side fastening portion or the first wire fastening portion. The retaining member may include a first nut receptacle that is open in the retaining member. The nut may be press-fitted or insert-molded into the first nut receptacle so that the bus bar is retained by the retaining member.

With the configuration described above, the bus bar is retained by the retaining member.

Further, a nut may be fastened to the second body-side fastening portion or the second wire fastening portion. The retaining member may include a second nut receptacle that is open in the retaining member. The nut may be press-fitted or insert-molded into the second nut receptacle so that the fuse is retained by the retaining member.

With the configuration described above, the fuse is retained by the retaining member.

The terminals and the charging inlet disclosed in the present description allow a wire to be routed in a direction differing from the rear side. Also, the number of components and the amount of work for coupling are reduced.

DETAILED DESCRIPTION

An embodiment will now be described with reference to FIGS. 1 to 13.

The present embodiment of a charging inlet 10 is used to charge an electric vehicle or the like and is installed on the side of the vehicle. In the description hereafter, the Z-direction, the X-direction, and the Y-direction shown in FIGS. 3 to 6 refer to the upper side, the front side, and the right side, respectively.

Figure 1:
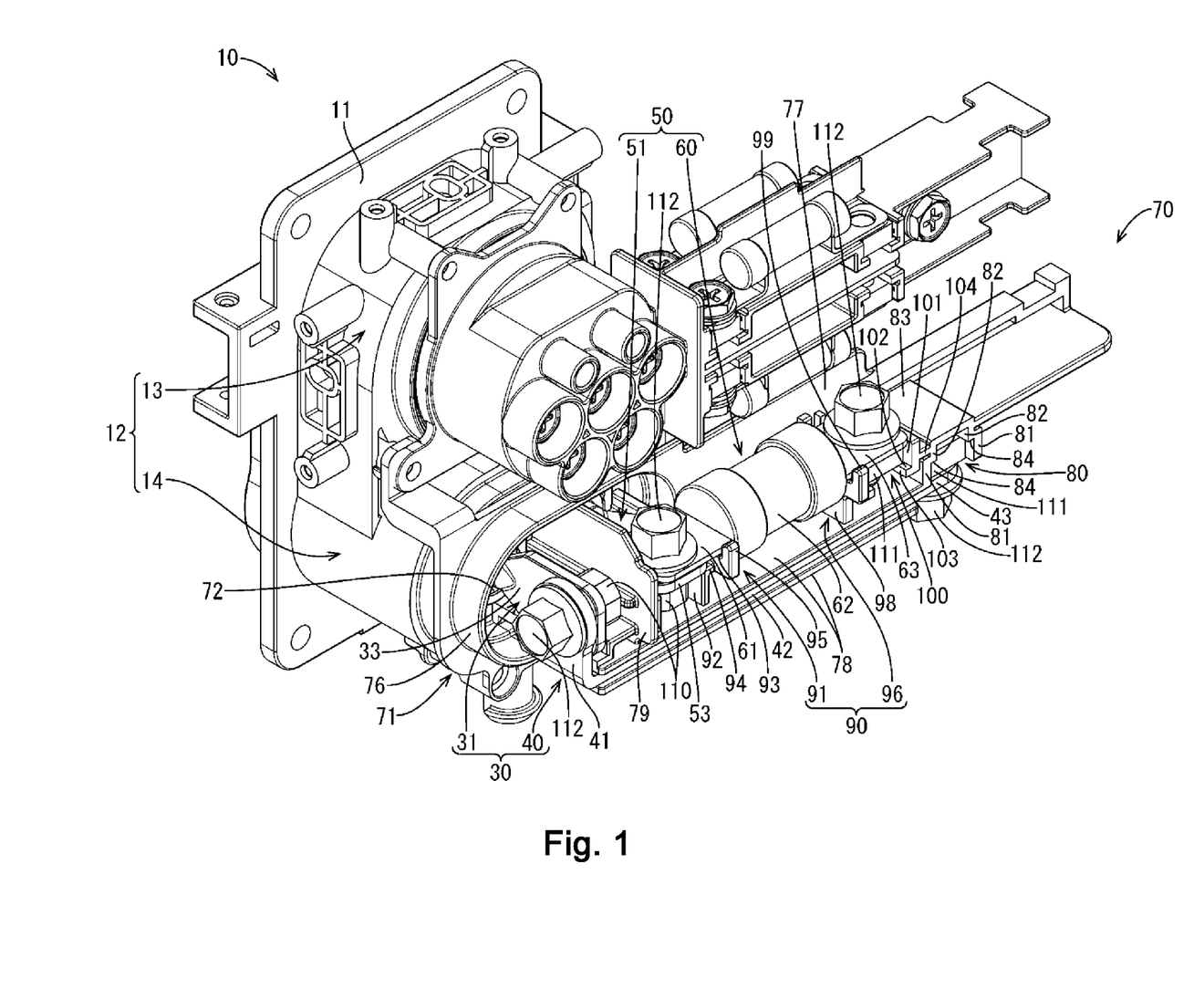
FIG. 1 is a perspective rear view of a charging inlet.
Figure 2:
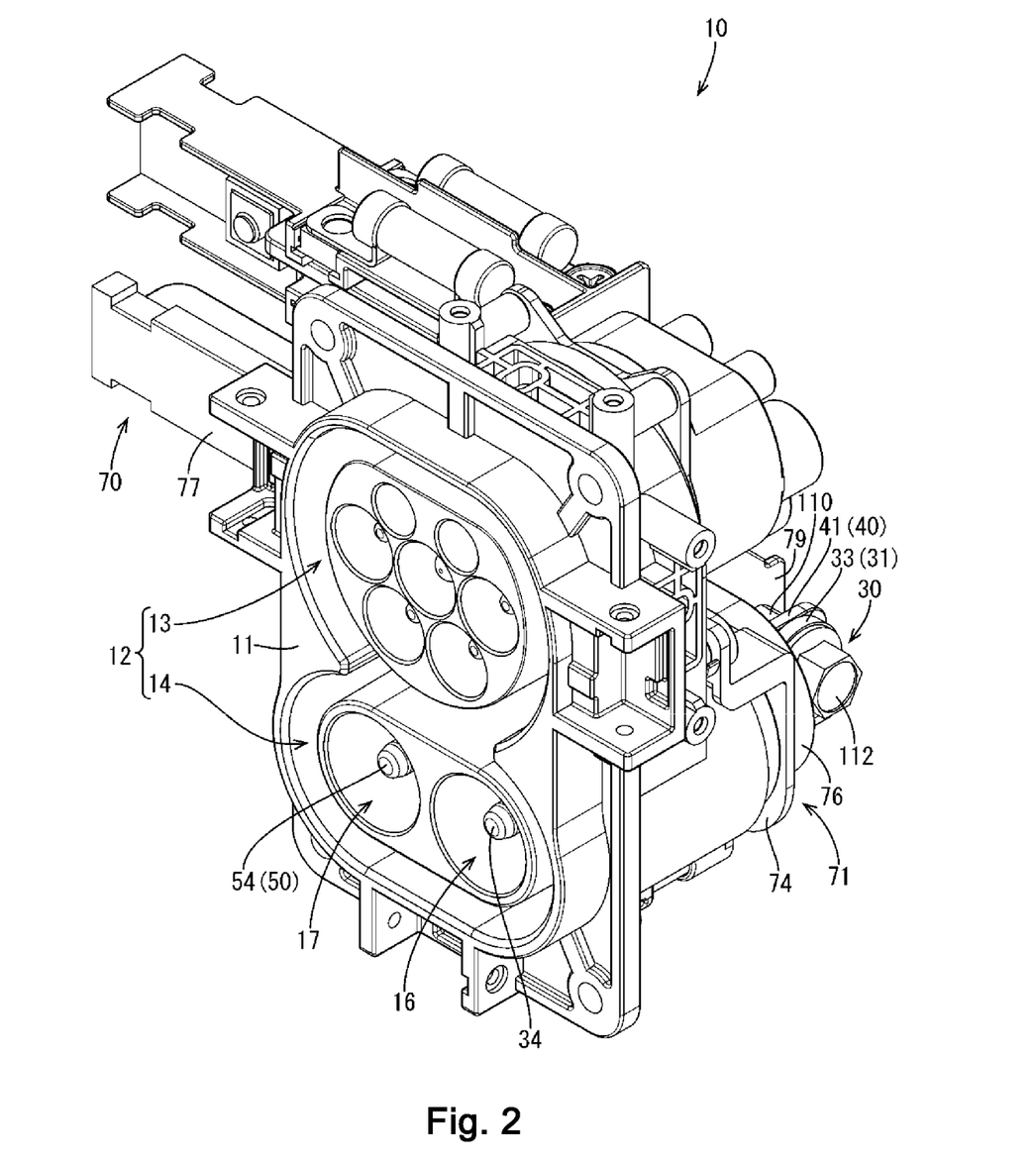
FIG. 2 is a perspective front view of the charging inlet.

As shown in FIGS. 1 and 2, the charging inlet 10 includes a rectangular flat plate 11 and an inlet body 12. The inlet body 12 includes a normal charging unit 13 and a fast charging unit 14. The normal charging unit 13 is disposed on an upper portion of the flat plate 11. The fast charging unit 14 is disposed on a lower portion of the flat plate 11.

Figure 6:
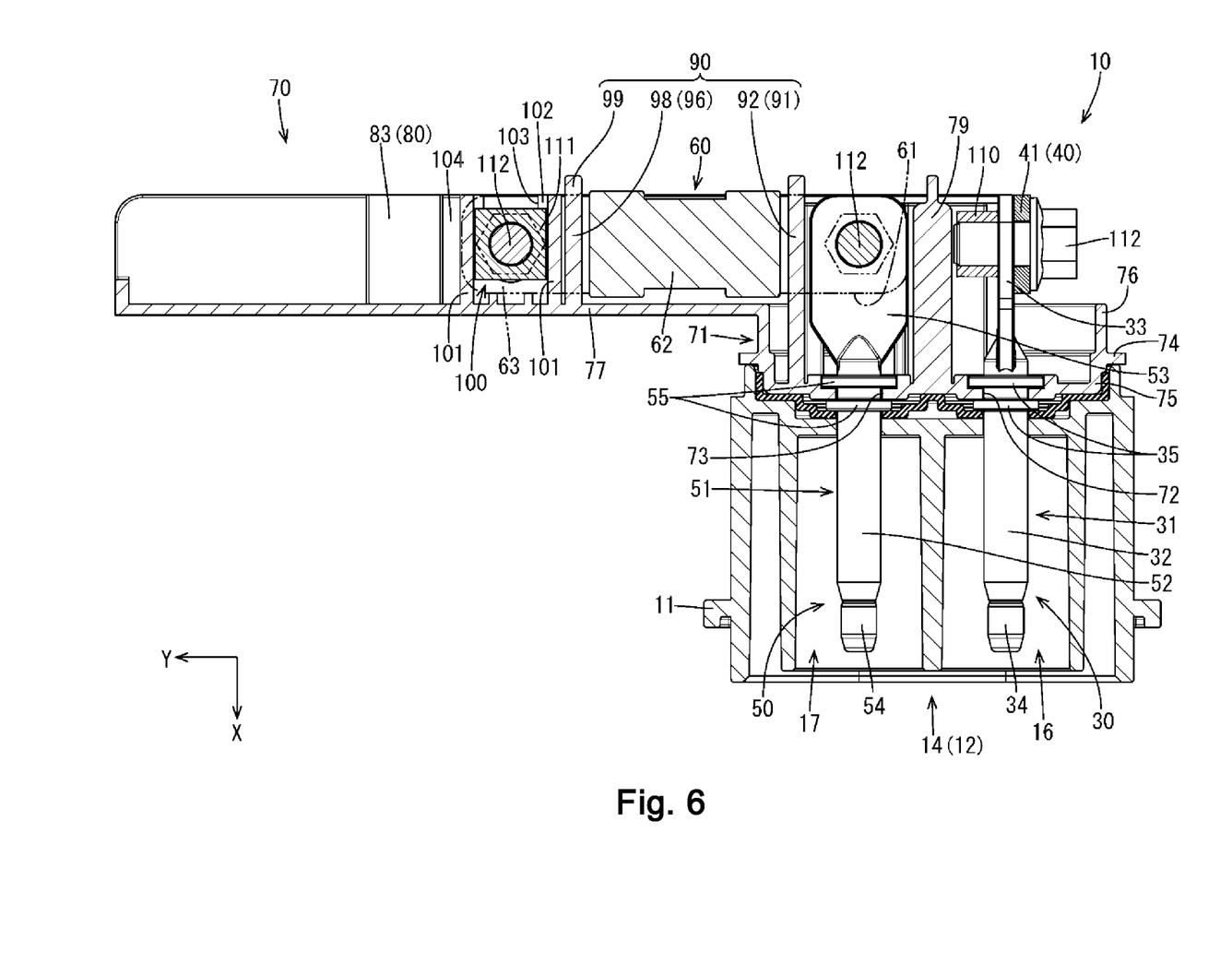
FIG. 6 is a cross-sectional view taken along line B-B in FIG. 4.

As shown in FIGS. 1 and 2, the fast charging unit 14 is oval and projects from the flat plate 11 in a front-rear direction. As shown in FIG. 6, the fast charging unit 14 includes a first terminal receptacle 16 and a second terminal receptacle 17, each of which is open in the front-rear direction. A retaining member 70 is attached to the fast charging unit 14 from the rear side. A first terminal 30 and a second terminal 50 are coupled to the retaining member 70.

Figure 7:
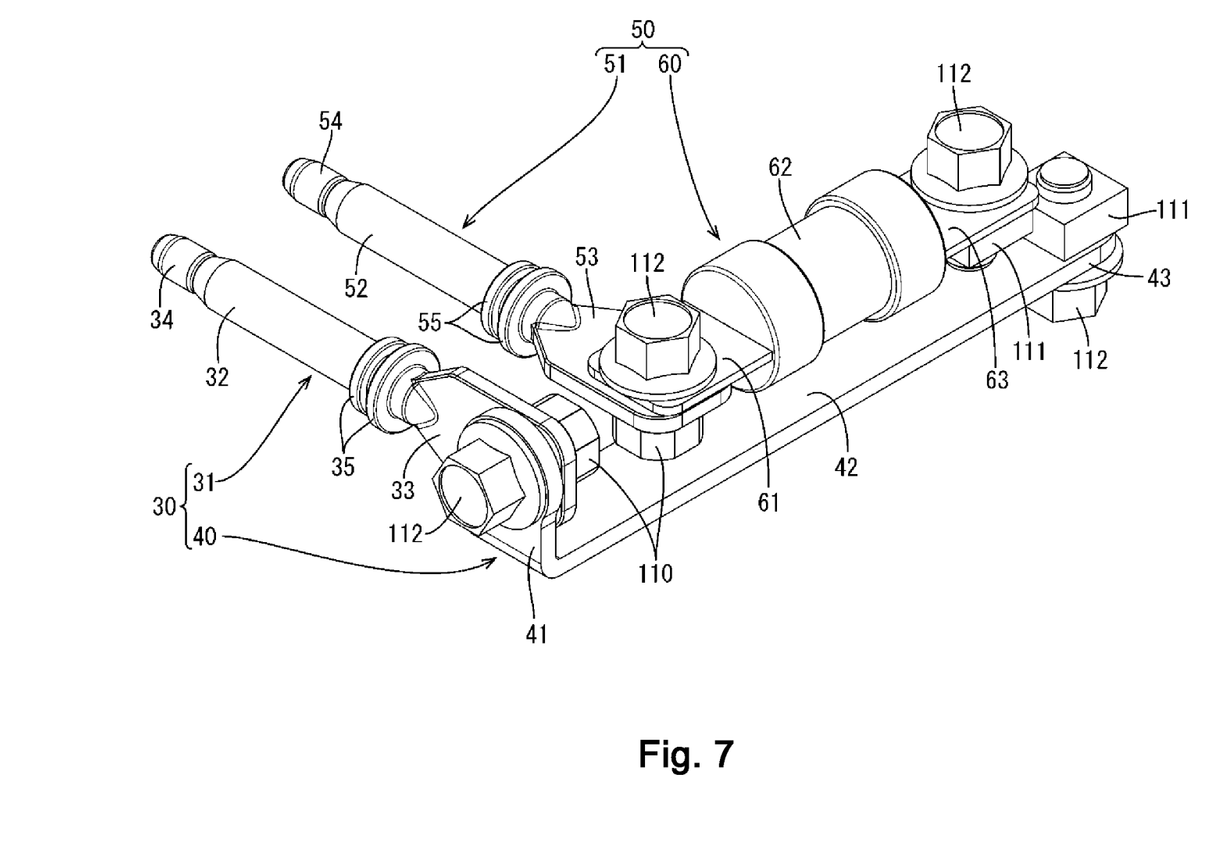
FIG. 7 is a perspective rear view of a first terminal and a second terminal.
Figure 8:
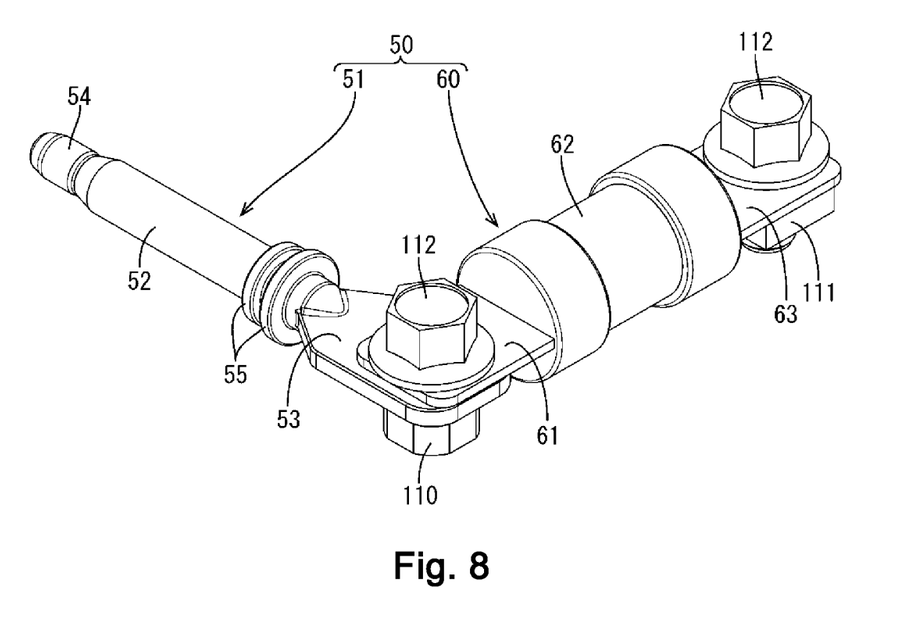
FIG. 8 is a perspective rear view of the second terminal.

As shown in FIG. 7, the first terminal 30 is a ground terminal and includes a first terminal body 31 and a bus bar 40.

As shown in FIG. 7, the first terminal body 31 includes a first terminal connector 32 and a first body-side fastening portion 33. The first terminal connector 32 has an overall circular rod shape and extends in the front-rear direction. The first body-side fastening portion 33 has the form of a rectangular plate and projects from the rear end of the first terminal connector 32 toward the rear side. A plastic cap 34 is attached to the front end of the first terminal connector 32. Two flanges 35 extend around from the vicinity of the rear end of the first terminal connector 32 and are spaced apart from each other by a certain gap. The first body-side fastening portion 33 includes a fastening hole that is open to allow for insertion of a bolt 112, which will be described later. Further, a hex weld nut 110 is welded to the right surface of the first body-side fastening portion 33.

As shown in FIG. 7, the bus bar 40 is L-shaped. The bus bar 40 includes a bus bar-side fastening portion 41 and a bus bar body 42. The bus bar-side fastening portion 41 projects toward the upper side and is fastened to the first body-side fastening portion 33. The bus bar body 42 projects from the lower end of the bus bar-side fastening portion 41 toward the right side. The right end of the bus bar body 42 includes a first wire fastening portion 43. A fastening hole is open in each of the bus bar-side fastening portion 41 and the first wire fastening portion 43.

As shown in FIG. 7, a bolt 112 is inserted through the fastening hole of the first body-side fastening portion 33 and the fastening hole of the bus bar-side fastening portion 41 from the left side. Further, the bolt 112 engages the hex weld nut 110 that is fastened to the first body-side fastening portion 33. As a result, the first body-side fastening portion 33 is fastened to the bus bar-side fastening portion 41. The bus bar-side fastening portion 41 is configured to pivot in relation to the first body-side fastening portion 33.

As shown in FIG. 7, a bolt 112 is inserted into the fastening hole of the first wire fastening portion 43 from the lower side and is engaged with a square nut 111 that is disposed on the upper surface of the first wire fastening portion 43. Further, although not shown in the drawings, a so-called LA (an abbreviation of an automotive ring terminal fitting in JIS) terminal fitting that is connected to a wire is fastened to the first wire fastening portion 43.

As shown in FIG. 7, the second terminal 50 is a power terminal and includes a second terminal body 51 and a fuse 60.

As shown in FIG. 7, the second terminal body 51 has a configuration such that the first terminal body 31 is rotated clockwise by ninety degrees about the first terminal connector 32. In the same manner as the first terminal body 31, the second terminal body 51 includes a second terminal connector 52 and a second body-side fastening portion 53. A plastic cap 54 is attached to the front end of the second terminal connector 52. Two flanges 55 extend around from the vicinity of the rear end of the second terminal connector 52. The second body-side fastening portion 53 includes a fastening hole that is open to allow for insertion of a bolt 112. Further, a hex weld nut 110 is welded to the lower surface of the second body-side fastening portion 53.

As shown in FIG. 7, the fuse 60 includes a fuse-side fastening portion 61 fastened to the second body-side fastening portion 53, a fuse body 62 projecting from the right end of the fuse-side fastening portion 61 toward the right side, and a second wire fastening portion 63 projecting from the right end of the fuse body 62 toward the right side. The fuse-side fastening portion 61 and the second wire fastening portion 63 are rectangular. A fastening hole is open in each of the fuse-side fastening portion 61 and the second wire fastening portion 63. The fuse body 62 is tubular and includes a fuse element, which is not shown in the drawings, in the fuse body 62. Although not shown in the drawings, the fuse element has one end connected to the fuse-side fastening portion 61 and the other end connected to the second wire fastening portion 63. Thus, when overcurrent flows to the fuse 60, the fuse element disconnects so that the fuse-side fastening portion 61 is electrically disconnected from the second wire fastening portion 63.

As shown in FIG. 7, a bolt 112 is inserted through the fastening hole of the second body-side fastening portion 53 and the fastening hole of the fuse-side fastening portion 61 from the upper side. Further, the bolt 112 engages the hex weld nut 110 that is fastened to the second body-side fastening portion 53. As a result, the second body-side fastening portion 53 is fastened to the fuse-side fastening portion 61. As described above, since the fuse-side fastening portion 61 is fastened to the second body-side fastening portion 53, a typical wire that connects the second body-side fastening portion 53 and the fuse-side fastening portion 61 is not needed. This reduces the number of components and the amount of work for coupling.

As shown in FIG. 7, a bolt 112 is inserted into the fastening hole of the second wire fastening portion 63 from the upper side and is engaged with a square nut 111 that is disposed on the lower surface of the second wire fastening portion 63. Further, although not shown in the drawings, an LA terminal fitting that is connected to a wire is fastened to the second wire fastening portion 63.

Figure 9:
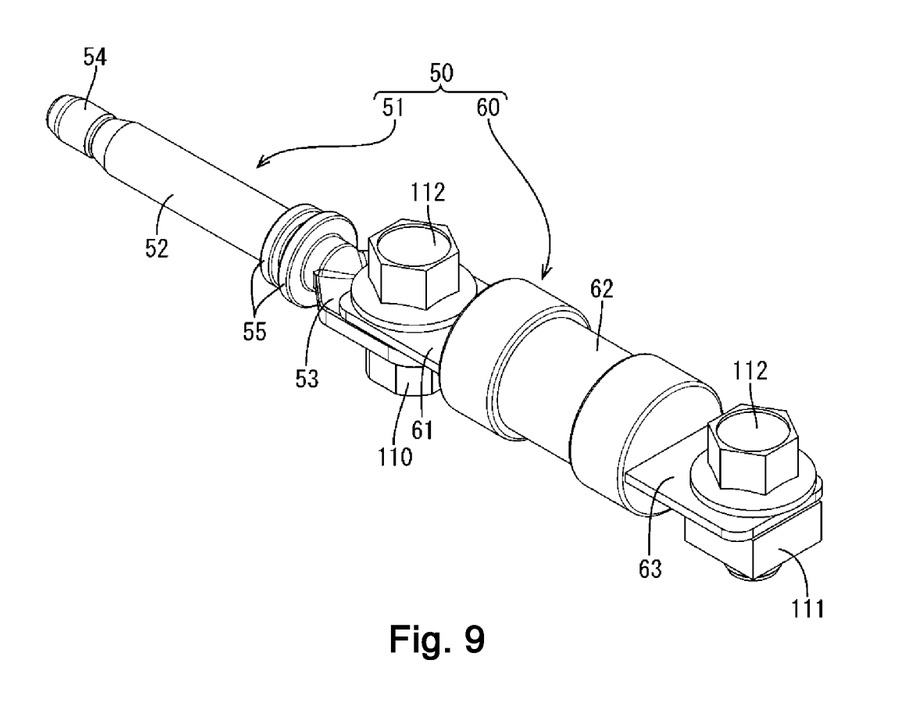
FIG. 9 is a perspective rear view of the second terminal when a fuse is pivoted toward the rear side.
Figure 10:
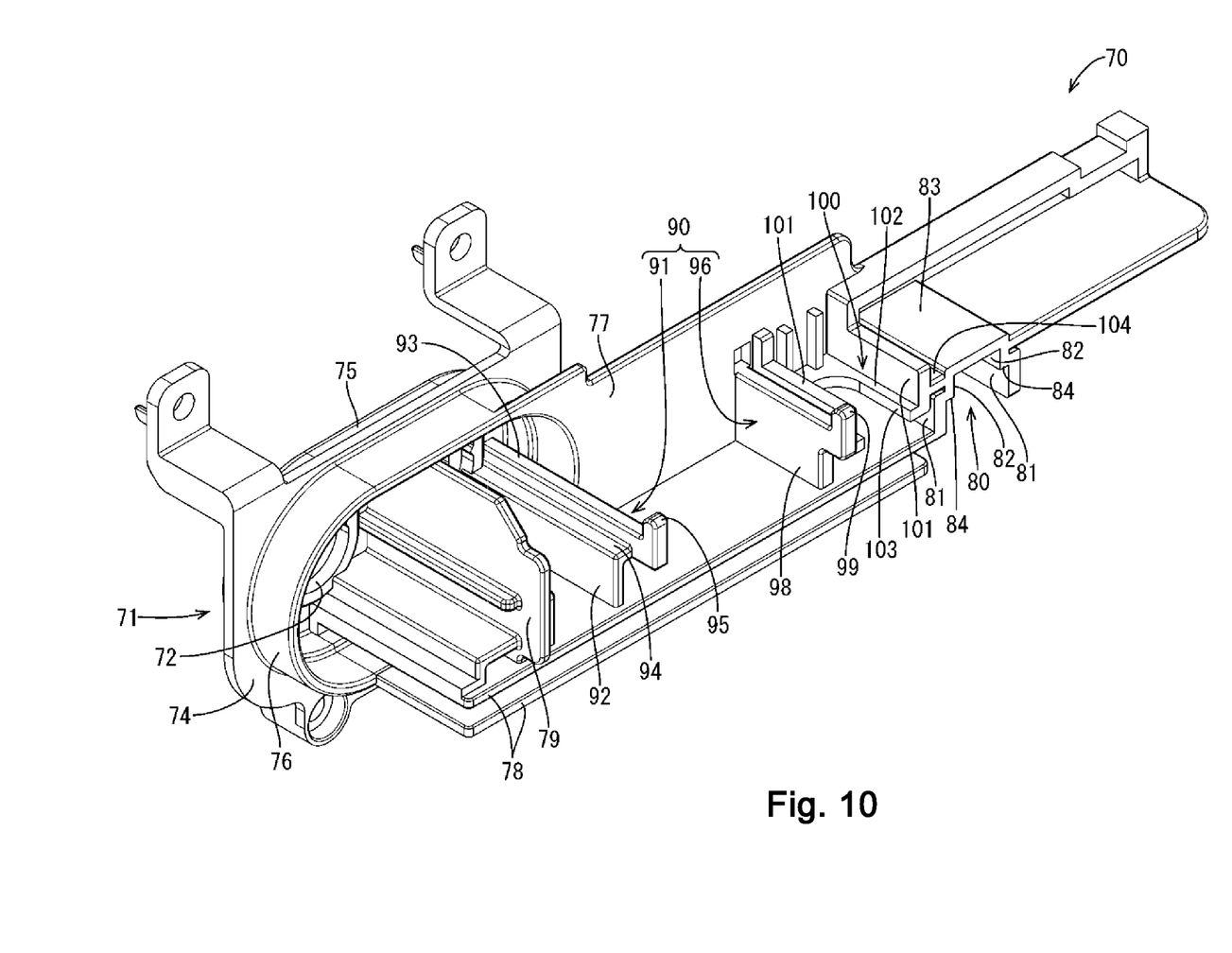
FIG. 10 is a perspective rear view of a retaining member.

The fuse-side fastening portion 61 is configured to pivot in relation to the second body-side fastening portion 53. When routing a wire fastened to the second wire fastening portion 63, for example, toward the rear side, the fuse-side fastening portion 61 may be pivoted so that the second wire fastening portion 63 is directed toward the rear side, as shown in FIG. 9. This routes the wire toward the rear side.

As shown in FIGS. 10 to 13, the retaining member 70 includes a retaining body 71, a protruding portion 77, two holding plates 78, a first nut receptacle 80, a fuse body support 90, and a second nut receptacle 100.

Figure 12:
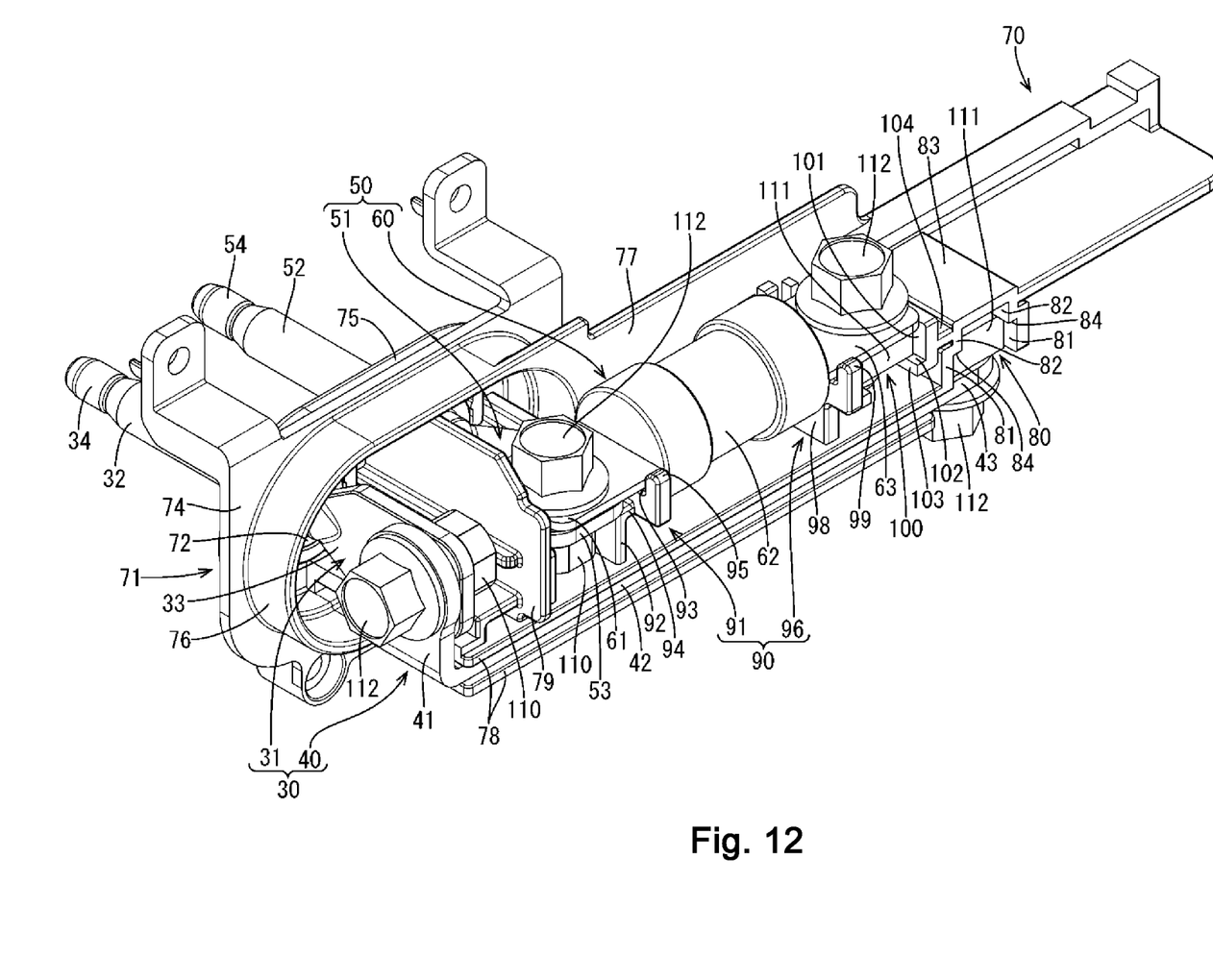
FIG. 12 is a perspective rear view of the retaining member after the first terminal and the second terminal are coupled.
Figure 13:
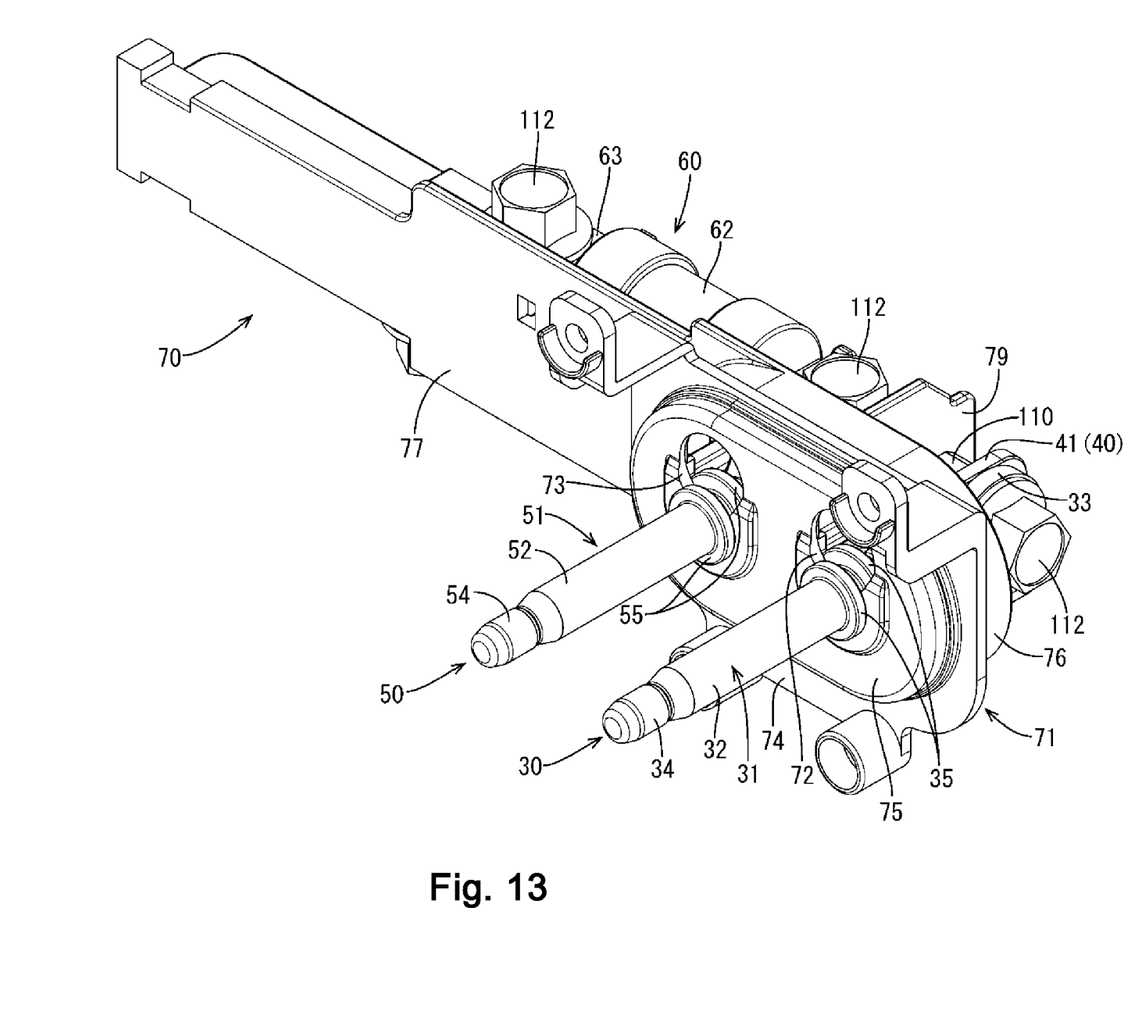
FIG. 13 is a perspective front view of the retaining member after the first terminal and the second terminals are coupled.

As shown in FIGS. 12 and 13, the retaining body 71 includes a flat retaining plate 74, an oval projection 75 projecting from the front surface of the retaining plate 74 toward the front side, and a hood portion 76 that is hood-shaped and is open in the rear surface of the retaining plate 74 toward the rear side. The oval projection 75 includes a first terminal insertion hole 72 and a second terminal insertion hole 73 that are separated from each other by a certain distance in the sideward direction. The first terminal insertion hole 72 and the second terminal insertion hole 73 are open in the oval projection 75 to allow for insertion of the first terminal connector 32 of the first terminal 30 and the second terminal connector 52 of the second terminal 50, respectively. The opening edge of the first terminal insertion hole 72 is fitted between the two flanges 35 of the first terminal 30. In the same manner, the opening edge of the second terminal insertion hole 73 is fitted between the second terminal 50 and the two flanges 55. This prevents separation of the first terminal body 31 and the second terminal body 51 in the front-rear direction. The protruding portion 77 protrudes from the opening edge of the hood portion 76 toward the right side.

Figure 3:
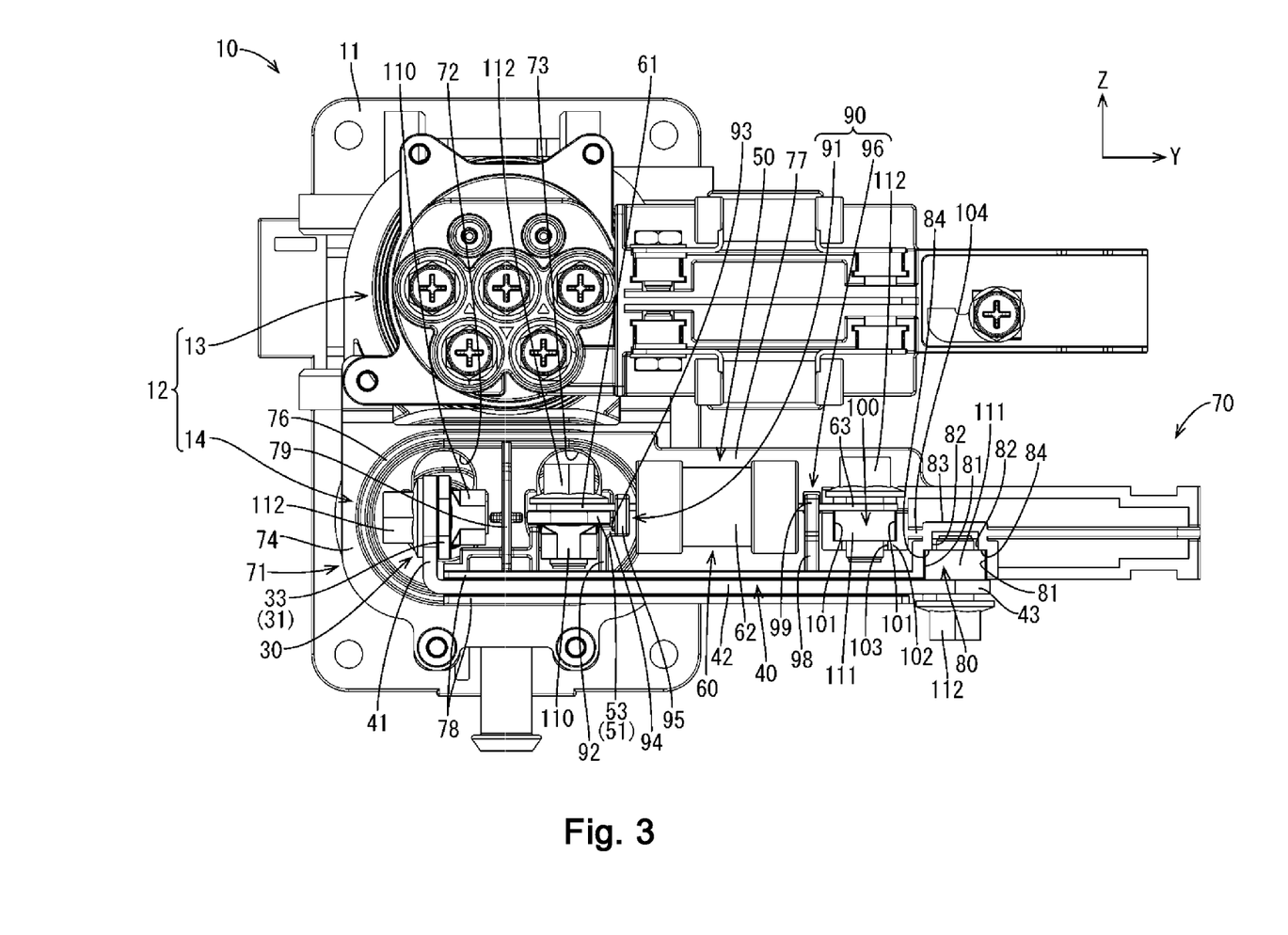
FIG. 3 is a rear view of the charging inlet.
Figure 4:
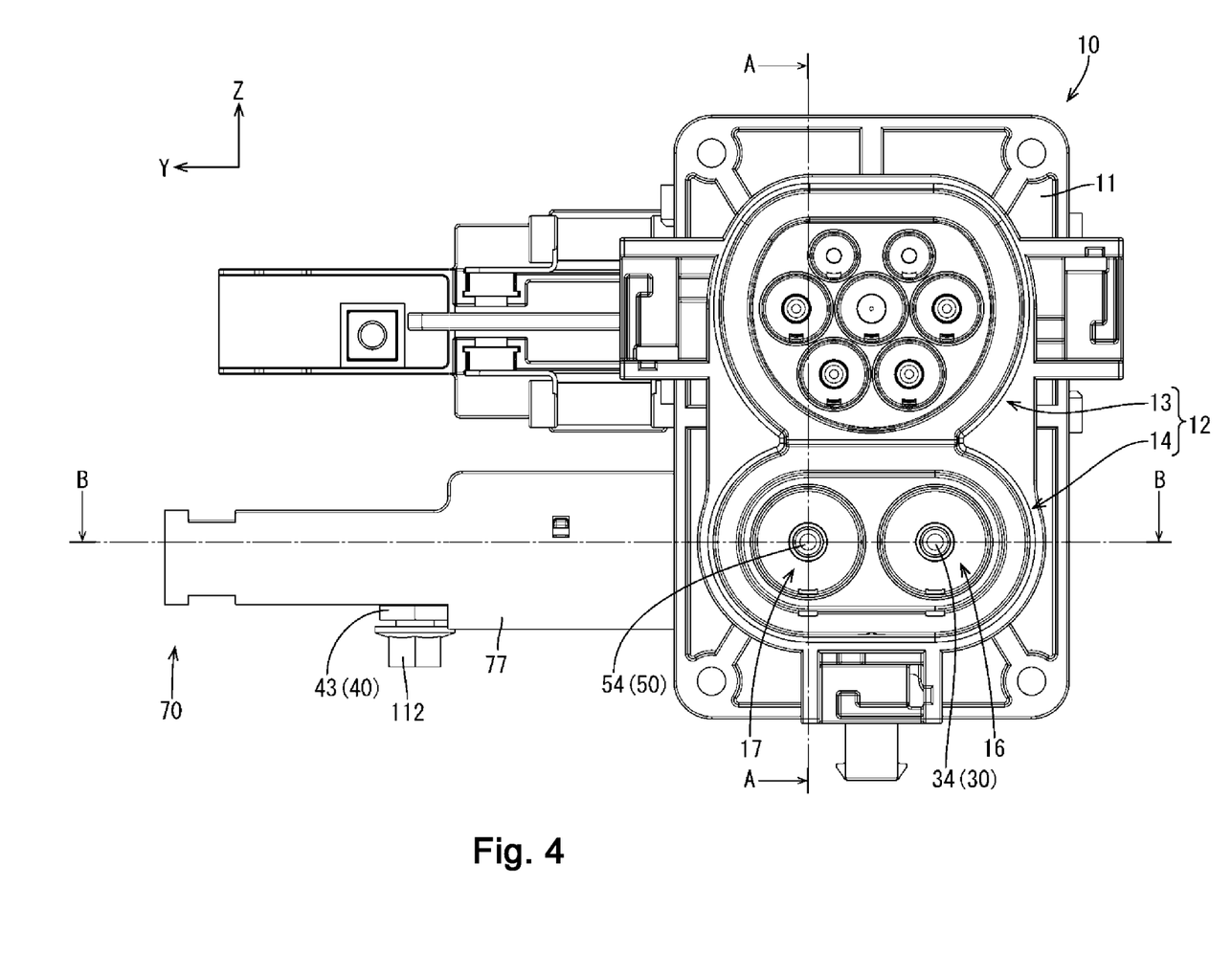
FIG. 4 is a front view of the charging inlet.
Figure 5:
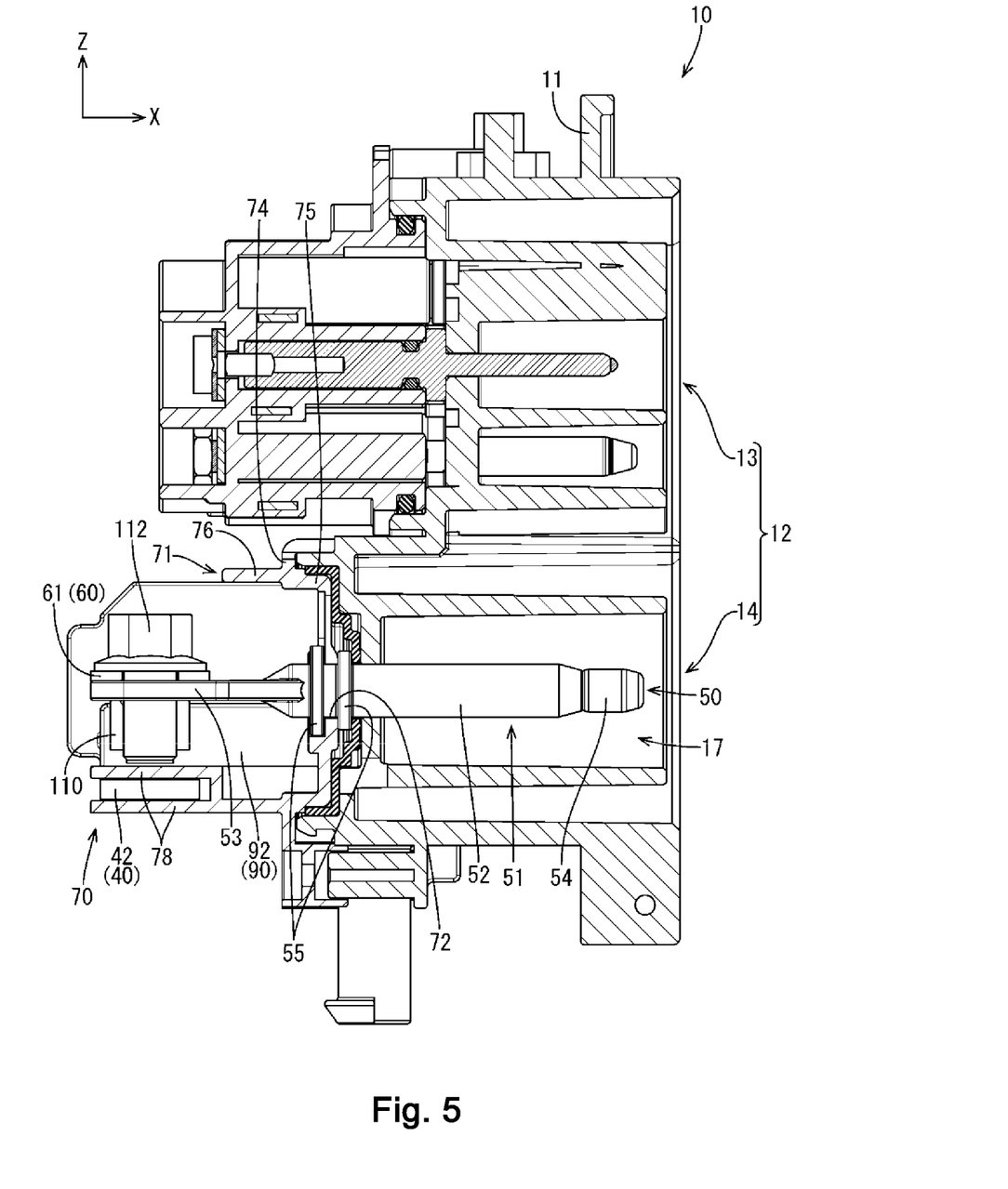
FIG. 5 is a cross-sectional view taken along line A-A in FIG. 4.
Figure 11:
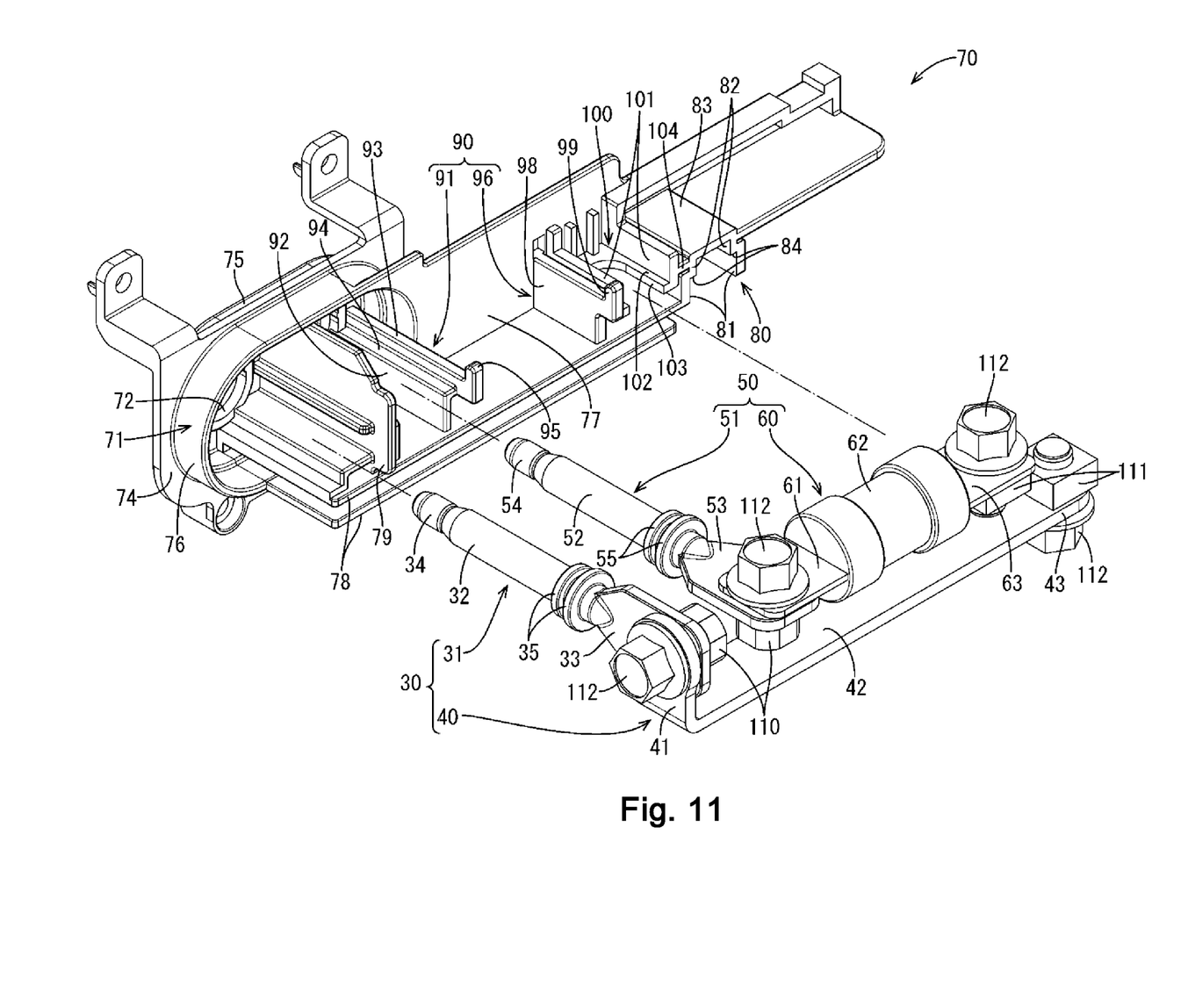
FIG. 11 is a perspective rear view of the retaining member before the first terminal and the second terminal are coupled.

As shown in FIG. 11, the two holding plates 78 are flat and extend in the sideward direction and are spaced apart in the vertical direction from each other by a gap configured to accommodate the bus bar body 42. The two holding plates 78 project from the protruding portion 77 toward the rear side. As shown in FIG. 3, the left end of each holding plate 78 extends to a position close to the first terminal insertion hole 72 in a rear view. The two holding plates 78 include a lower holding plate 78 continuous with the lower side of the opening edge of the hood portion 76 and an upper holding plate 78 having a left portion projecting toward the front side and continuous with the rear surface of the oval projection 75. The bus bar body 42 of the first terminal 30 is accommodated between the two holding plates 78. As described above, since the bus bar body 42 is held between the two holding plates 78, when coupling the bus bar 40 to the retaining member 70, downward separation of the bus bar 40 is prevented. This facilitates the coupling of the bus bar 40 to the retaining member 70.

As shown in FIGS. 3 and 11, a partition plate 79 projects from the rear surface of the oval projection 75 toward the rear side. The partition plate 79 is disposed between the first terminal insertion hole 72 and the second terminal insertion hole 73 in a rear view. As shown in FIG. 12, the first body-side fastening portion 33 and the second body-side fastening portion 53 are partitioned by the partition plate 79.

As shown in FIGS. 11 and 12, the first nut receptacle 80 projects upward and is defined by two first nut press-fitting walls 81, two first thread receiving walls 82, and a top wall 83. As shown in FIG. 12, the two first nut press-fitting walls 81 are flat and are arranged parallel to the left and right surfaces of the square nut 111 disposed on the upper surface of the first wire fastening portion 43. The first nut press-fitting wall 81 located at the left side has a lower end continuous with the right end of the upper holding plate 78. The gap between the two first nut press-fitting walls 81 is less than the width of the square nut 111 so that the square nut 111 is press-fitted between the two first nut press-fitting walls 81. Thus, the bus bar 40 is retained by the retaining member 70. The two first thread receiving walls 82 are flat and parallel to the first nut press-fitting walls 81. The two first thread receiving walls 82 are connected to the two first nut press-fitting walls 81 by steps 84. The upper surface of the square nut 111 is in contact with the steps 84. When the bolt 112 is inserted through the fastening hole of the first wire fastening portion 43, the threads of the bolt 112 are received between the two first thread receiving walls 82. The top wall 83 is flat and continuous with the upper ends of the two first thread receiving walls 82. In FIG. 12, for the sake of convenience, when the square nuts 111 are fixed to the first wire fastening portion 43, the square nuts 111 are press-fitted into the first nut receptacle 80 from the rear side. However, before the first terminal 30 is coupled to the retaining member 70, the square nut 111 may be press-fitted into the first nut receptacle 80 from the lower side or the rear side in advance.

As shown in FIGS. 11 and 12, the fuse body support 90 is configured by a left support portion 91 and a right support portion 96.

As shown in FIGS. 11 and 12, the left support portion 91 includes a left support base 92 projecting from the upper surface of the upper holding plate 78 toward the upper side, a block-shaped left seat 93 elongated in the front-rear direction and in contact with the fuse-side fastening portion 61 from the lower side to support the fuse body 62, and a left joint 94 joining the upper end of the right surface of the left support base 92 and the lower end of the left surface of the left seat 93. In addition, the left support base 92 includes a left protrusion 95 projecting from the rear end of the left seat 93 toward the upper side so that the left protrusion 95 is contactable with a side edge of the fuse-side fastening portion 61. This prevents the fuse-side fastening portion 61 from moving toward the rear side and separating from the left seat 93.

As shown in FIGS. 11 and 12, the right support portion 96 is disposed at the right side of the left support portion 91 and is spaced apart from the left support portion 91 by a certain gap. The right support portion 96 includes a right seat 98 and a right protrusion 99. The right seat 98 projects from the upper surface of the upper holding plate 78 toward the upper side and is in contact with the second wire fastening portion 63 from the lower side to support the fuse body 62. The right protrusion 99 is block-shaped and elongated in the vertical direction. The lower side of the front surface of the right protrusion 99 is continuous with the upper side of the rear surface of the right seat 98. The upper side of the front surface of the right protrusion 99 is contactable with a side edge of the second wire fastening portion 63. This prevents the second wire fastening portion 63 from moving toward the rear side and separating from the right seat 98 toward the rear side.

As shown in FIGS. 11 and 12, the second nut receptacle 100 is disposed between the right support portion 96 and the first nut receptacle 80 and includes two second nut press-fitting walls 101 and a bottom portion 102. As shown in FIG. 12, the two second nut press-fitting walls 101 are flat and are arranged parallel to the left and right surfaces of the square nut 111 disposed on the lower surface of the second wire fastening portion 63. The right surface of the second nut press-fitting wall 101 located at the right side is joined to the left surface of the first thread receiving wall 82 located at the left side of the first nut receptacle 80 by a right joint 104. As shown in FIG. 11, the bottom portion 102 is continuous with the lower ends of the two second nut press-fitting walls 101. A bottom groove 103, which may be a semi-circular or arcuate shape, is open in the bottom portion 102. The gap between the two second nut press-fitting walls 101 is less than the width of the square nut 111 so that the square nut 111 is press-fitted between the two second nut press-fitting walls 101. Thus, the fuse 60 is retained by the retaining member 70. The lower surface of the square nut 111 is in contact with the bottom portion 102. As shown in FIG. 12, the bolt 112 inserted through the fastening hole of the second wire fastening portion 63 is inserted through the bottom groove 103.

As shown in FIG. 1, the retaining member 70 is attached to the fast charging unit 14 of the inlet body 12 from the rear side. As shown in FIG. 6, the first terminal connector 32 of the first terminal 30 and the second terminal connector 52 of the second terminal 50 retained by the retaining member 70 are accommodated in the first terminal receptacle 16 and the second terminal receptacle 17, respectively.

The operation of the present embodiment will now be described.

Although not shown in the drawings, when the first wire fastening portion 43 of the bus bar 40 is arranged to overlap an LA terminal fitting that is connected to a wire, the bolt 112 is inserted through the fastening hole of the first wire fastening portion 43 and the fastening hole of the LA terminal fitting connected to the wire from the lower side. In addition, the bolt 112 engages the square nut 111 that is press-fitted into the first nut receptacle 80. As a result, the first wire fastening portion 43 is fastened to the LA terminal fitting, and the first terminal 30 is electrically connected to the wire connected to the LA terminal fitting. Since the bus bar 40 extends from the first body-side fastening portion 33 toward the right side, the wire is routed toward the right side. Although not shown in the drawings, when the LA terminal fitting is rotated ninety degrees in the clockwise direction about the first wire fastening portion 43, the wire is routed toward the rear side.

Although not shown in the drawings, when the second wire fastening portion 63 of the fuse 60 is arranged to overlap the LA terminal fitting connected to the wire, the wire is routed toward the right side. Although not shown in the drawings, when the LA terminal fitting is rotated ninety degrees in the clockwise direction about the second wire fastening portion 63, the wire is routed toward the rear side.

As described above, in the present embodiment, when a wire (not shown) connected to the first wire fastening portion 43 of the bus bar 40 extends along the direction of the bus bar 40, the routing direction of the wire may be changed to a direction other than the rear side, for example, by using the bus bar 40 that is directed in a direction other than the rear side or pivoting the first wire fastening portion 43 of the bus bar 40 in relation to the first body-side fastening portion 33 of the first terminal body 31.

In addition, since the bus bar body 42 is held between the two holding plates 78, the bus bar 40 is readily coupled to the retaining member 70.

In addition, since the fuse-side fastening portion 61 of the fuse 60 is fastened to the second body-side fastening portion 53, a typical wire that connects the second terminal body and the fuse is not needed. This reduces the number of components and the amount of work for coupling.

In addition, the fuse-side fastening portion 61 of the fuse 60 is fastened to be pivotable in relation to the second body-side fastening portion 53. Thus, the routing direction of a wire connected to the second wire fastening portion 63 of the fuse 60 may be changed to a direction other than the rear side.

In addition, the bus bar 40 is retained by the retaining member 70.

In addition, the fuse 60 is retained by the retaining member 70.

The techniques disclosed in this specification are not limited to those described in the embodiment with reference to the drawings and may include, for example, various modes described below.

In the present embodiment, the first terminal 30 is a ground terminal, and the second terminal 50 is a power terminal. However, the first terminal 30 and the second terminal 50 may be switched.

In the present embodiment, the hex weld nuts 110 are welded to the first body-side fastening portion 33 and the second body-side fastening portion 53. Typical non-welding nuts may be used.

In the present embodiment, the first terminal 30 and the second terminal 50 are used for fast charging. Instead, the first terminal 30 and the second terminal 50 may be used for normal charging.

In the present embodiment, the bus bar 40 of the first terminal 30 extends from the first body-side fastening portion 33 toward the right side. However, the direction of the bus bar may be changed to a different direction (e.g., diagonally lower side) by rotating the first terminal body or pivoting the bus bar-side fastening portion. In the same manner, the fuse of the second terminal may be directed to a diagonally lower side. In this case, the protruding portion of the retaining member may also protrude to a diagonally lower side.

In the present embodiment, the bus bar 40 of the first terminal 30 and the fuse 60 of the second terminal 50 retained by the retaining member 70 are configured to extend toward the right side. The retaining member 70 may be rotated 180 degrees and attached to the fast charging unit 14 so that the bus bar of the first terminal and the fuse of the second terminal retained by the retaining member are configured to extend to the left side. Accordingly, wires connected to the bus bar and the fuse may be routed toward the left side.

DESCRIPTION OF THE REFERENCE CHARACTERS 10) charging inlet
12) inlet body
30) first terminal
31) first terminal body
32) first terminal connector 33) first body-side fastening portion
40) bus bar
41) bus bar-side fastening portion
42) bus bar body
43) first wire fastening portion
50) second terminal
51) second terminal body
52) second terminal connector
53) second body-side fastening portion
60) fuse
61) fuse-side fastening portion
62) fuse body
63) second wire fastening portion
70) retaining member
71) retaining body
72) first terminal insertion hole
73) second terminal insertion hole
77) protruding portion
78) holding plate
80) first nut receptacle
100) second nut receptacle
111) square nut (nut)

The invention claimed is:

1. A charging inlet, comprising:
   a first terminal including a first terminal body and a bus bar;
   an inlet body accommodating the first terminal body; and
   a retaining member attached to the inlet body from a rear side, wherein
   the first terminal body includes a first terminal connector and a first body-side fastening portion,
   the first terminal connector extends in a front-rear direction and has an overall circular rod shape,
   the first body-side fastening portion is disposed on a rear end of the first terminal connector,
   the bus bar includes a bus bar-side fastening portion fastened to be pivotable in relation to the first body-side fastening portion, a first wire fastening portion configured to fasten a terminal connected to a wire, and a bus bar body electrically connecting the bus bar-side fastening portion and the first wire fastening portion,
   the retaining member includes a retaining body and a protruding portion,
   the retaining body includes a first terminal insertion hole that is open so that the first terminal connector is inserted through the first terminal insertion hole, and
   the protruding portion is disposed along the bus bar body to retain the bus bar.

2. The charging inlet according to claim 1, wherein the protruding portion includes two holding plates holding the bus bar body.

3. The charging inlet according to claim 1, further comprising:
   a second terminal including a second terminal body and a fuse, wherein
   the second terminal body includes a second terminal connector and a second body-side fastening portion,
   the second terminal connector extends in the front-rear direction and has an overall circular rod shape,
   the second body-side fastening portion is disposed on a rear end of the second terminal connector,
   the fuse includes a fuse-side fastening portion fastened to be pivotable in relation to the second body-side fastening portion, a second wire fastening portion configured so that a terminal connected to a wire is fastened to the second wire fastening portion, and a fuse body electrically connecting the fuse-side fastening portion and the second wire fastening portion so that electrical connection is disconnected when overcurrent flows,
   the inlet body accommodates the second terminal body,
   the retaining body includes a second terminal insertion hole that is open so that the second terminal connector is inserted through the second terminal insertion hole, and
   the fuse is disposed along the protruding portion.

4. The charging inlet according to claim 1, wherein
   a nut is fastened to the first body-side fastening portion or the first wire fastening portion,
   the retaining member includes a first nut receptacle that is open in the retaining member, and
   the nut is press-fitted or insert-molded into the first nut receptacle so that the bus bar is retained by the retaining member.

5. The charging inlet according to claim 1, wherein
   a nut is fastened to the second body-side fastening portion or the second wire fastening portion,
   the retaining member includes a second nut receptacle that is open in the retaining member, and
   the nut is press-fitted or insert-molded into the second nut receptacle so that the fuse is retained by the retaining member.

* * * * *